March 26, 1957 D. J. PEEPS 2,786,716
SPRAY GUN
Filed March 29, 1954 4 Sheets-Sheet 1

INVENTOR.
DONALD J. PEEPS.
BY W. P. Carr
ATTORNEY

March 26, 1957
D. J. PEEPS
2,786,716
SPRAY GUN
Filed March 29, 1954
4 Sheets-Sheet 3
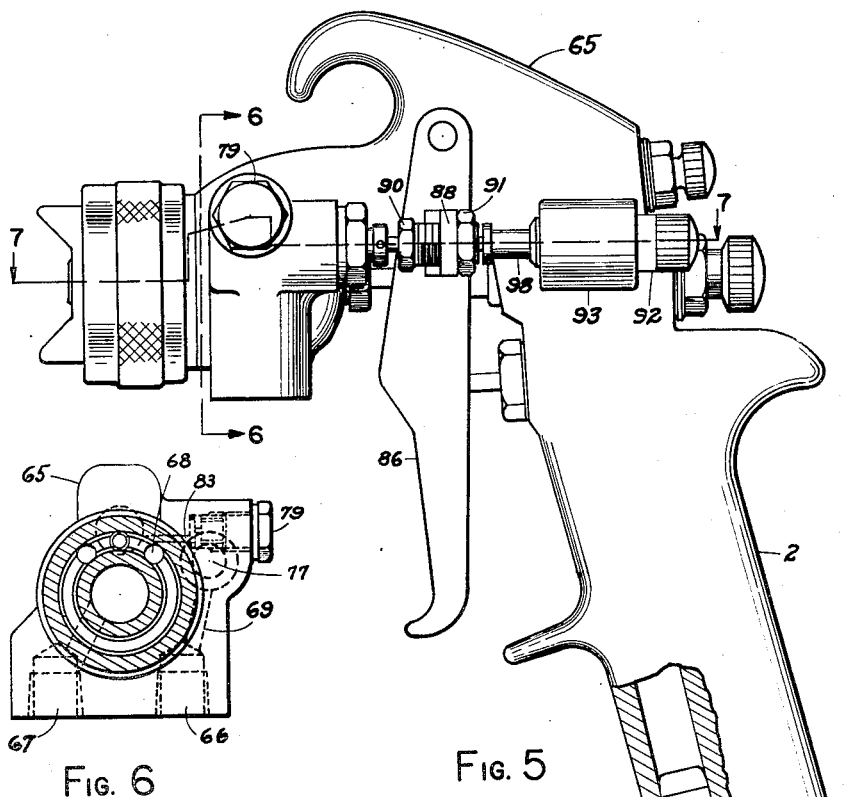
Fig. 6
Fig. 5
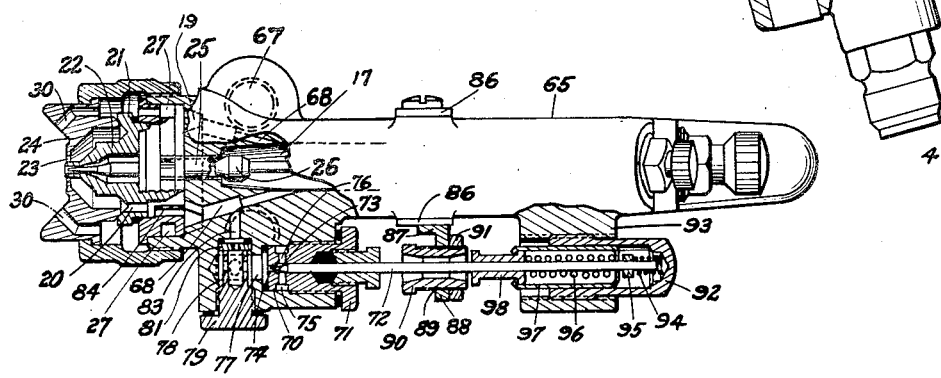
Fig. 7
INVENTOR.
DONALD J. PEEPS.
BY W. P. Carr
ATTORNEY

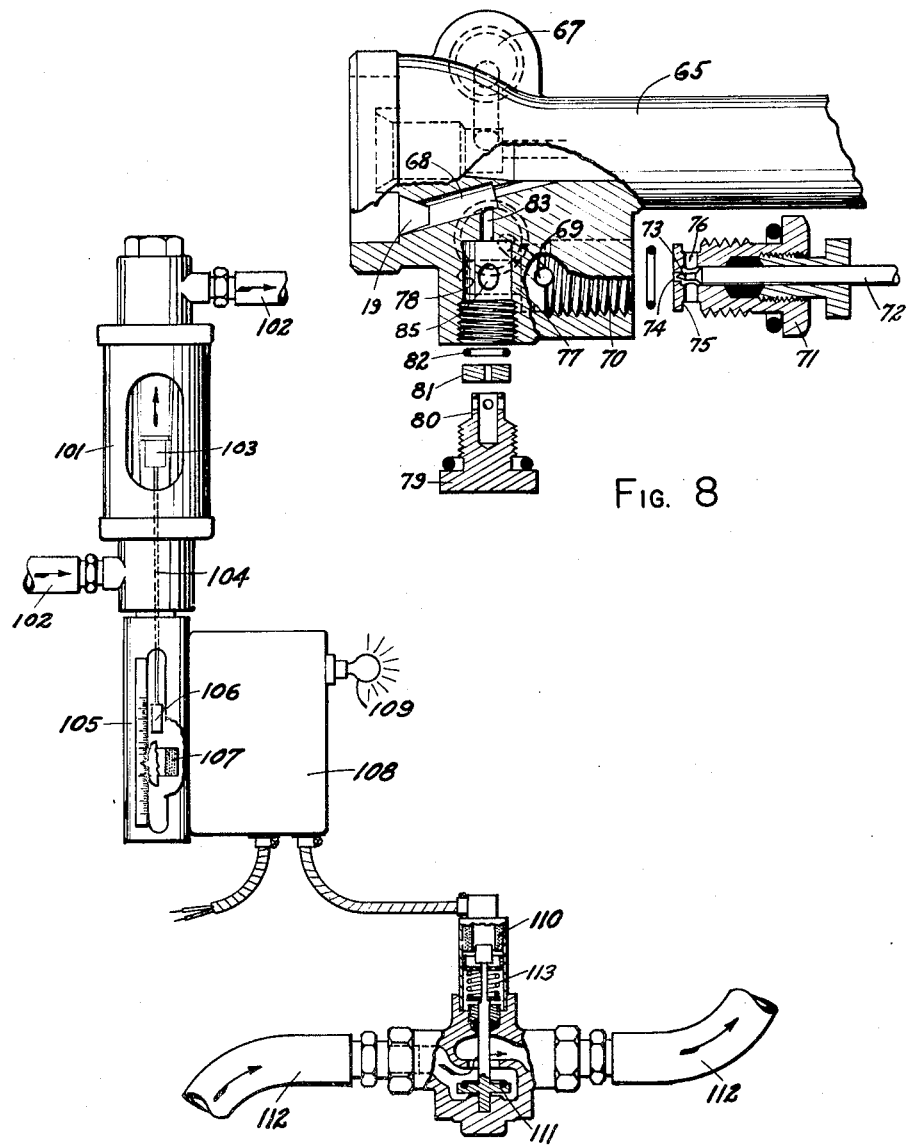

United States Patent Office 2,786,716
Patented Mar. 26, 1957

2,786,716

SPRAY GUN

Donald J. Peeps, Toledo, Ohio, assignor to The De Vilbiss Company, Toledo, Ohio, a corporation of Ohio Application March 29, 1954, Serial No. 419,432

19 Claims. (Cl. 299—86)

This invention relates to spray guns for applying a coating material and intermixing with the coating material at the time of spray discharge a comparatively small quantity of a secondary material. Such spray guns are particularly adapted to the purpose of introducing a reactive or catalytic agent which chemically promotes the gelation and hardening of a coating material, but are useful for adding any type of secondary material which may not be previously combined with the coating material because of some undesirable effects of such earlier intermixing.

The invention is of special value for distributing in the mass of a spray discharge of a normally thermal-setting resinous or plastic substance a catalytic, promoting, or reactive agent which induces or causes polymerization with a lesser amount of applied heat, or even without the addition of any heat beyond that provided by the surrounding atmosphere or arising from exothermic reaction of the applied coating.

These additive substances may be of various compositions and functions. For instance a peroxide catalyst may be the material thus added to a polyester resin. A different method could involve the earlier incorporation of the peroxide or other catalyst in the basic material with the later intermixing of an accelerator for the catalyst. Cobalt driers are one type of accelerator. With epoxy resins, amines may be the additive finally introduced in the spray application as a curing agent. The additive agent could be one of several coagulants for use in setting up a rubber latex coating material.

The proportion of the additive agent to the basic coating material may vary from extremes of one half to fifty percent but is usually no lower than one percent nor higher than ten percent. In any case, the ratio is likely to be critical with an unacceptable coating deposited if the ratio is not maintained.

An object of this invention is the provision of a spray gun which introduces the additive agent at an exact and uniform rate.

Another object is to provide a spray gun which effects a thorough intermixing of the additive agent with the basic coating material.

A further object is to provide a spray gun which may be operated and manipulated in an easy manner.

A supplemental object is to supply means for preventing the discharge of the coating material when the additive agent is not being discharged in the correct proportion.

Other objects and advantages of the invention may become apparent with a perusal of the following description and a study of the accompanying drawings.

Contributing to the securing of the recited objects are the arrangement of introducing the additive agent into the flow of atomizing air at a point within the spray gun and particularly in close range of the discharge nozzle, and the provision of a control valve for the agent, operative with the normal actuation of the spray gun. These and other cooperative features are set forth more specifically in the subsequent detailed description and shown in the drawings in which:

Figure 5 is an elevation of a more special spray gun embodying a form of my invention in which the feed line of the additive agent is connected to the forward end of the spray gun;

Figure 6 is a vertical section taken on the line 6—6 of Figure 5;

Figure 7 is a horizontal section taken on the line 7—7 of Figure 5;

Figure 8 is a view similar to that of Figure 7, slightly enlarged and with some parts disassembled; and Figure 9 illustrates somewhat diagrammatically a flow meter controlled warning signal and spray material supply valve.

Figure 1:
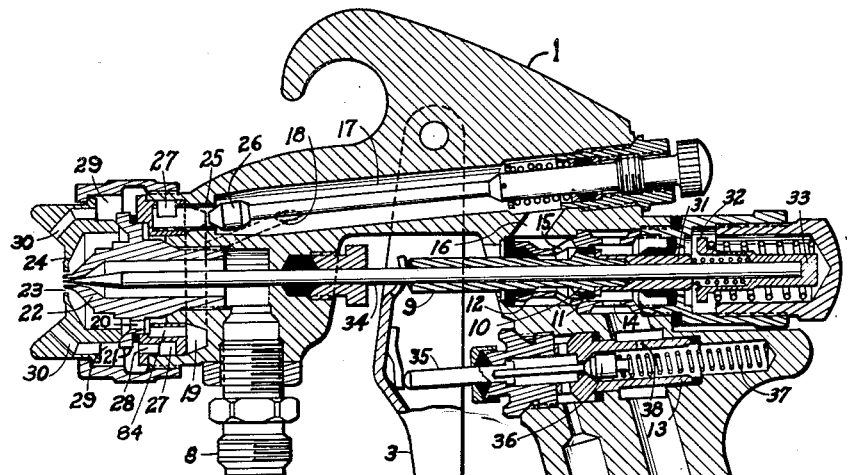
Figure 1 is a vertical section of a generally conventional spray gun embodying one form of my invention.
Figure 2:
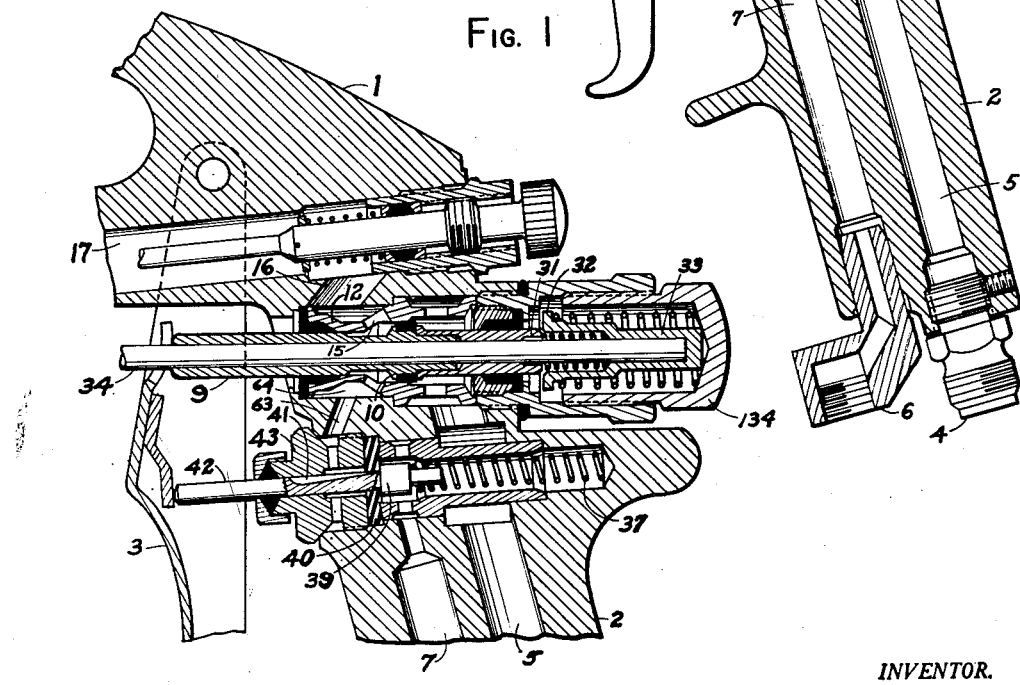
Figure 2 is a somewhat enlarged vertical section of the rearward portion of the same conventional spray gun with a slightly different incorporation of the invention.
Figure 3:
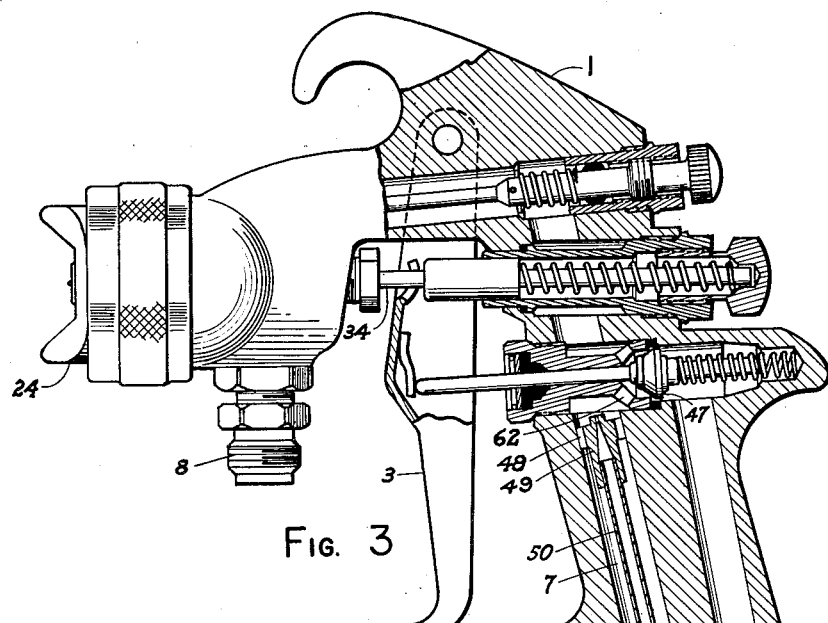
Figure 3 is a view of another generally conventional spray gun partly in elevation and partly in vertical section presenting a third modification.
Figure 4:
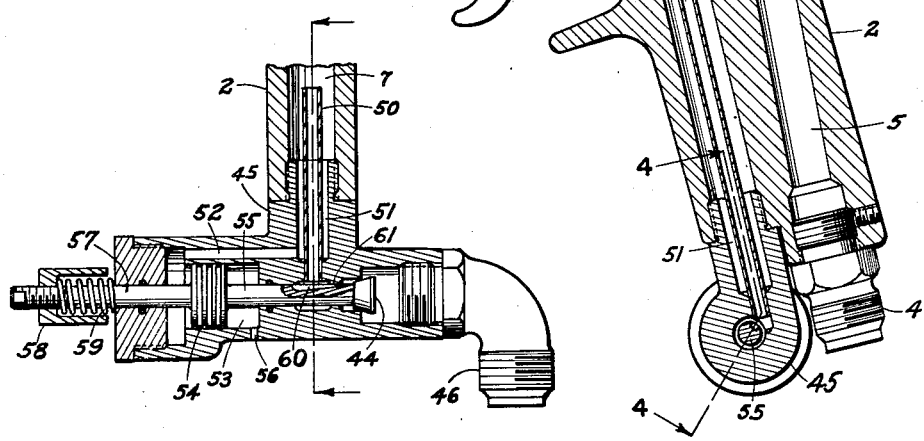
Figure 4 is a section of the automatic valve of the form presented in Figure 3 taken on the line 4—4 thereof.

The spray gun of Figure 1 has a body 1, a handle 2, and an actuating trigger 3. At the base of the handle is the atomizing air connection 4 communicating with bore 5 and the additive agent supply connection 6 leading to bore 7. Depending from the front end of the spray gun is the coating material connection 8. The air, additive agent and coating material are preferably delivered under pressure through hose to the spray gun from conventional supply sources.

With rearward movement of the trigger 3 the tubular stem 9 of the air valve 10 is thrust rearwardly and the air valve moved away from its seat 11 within the valve casing 12. The air in bore 5 then moves upwardly around the tube 13 into the valve casing 12 through ports 14, past the valve 10, and out ports 15. From here the air flows upwardly through passage 16 into the horizontal bore 17. At the forward end of bore 17 the air stream is divided in the usual manner with a portion travelling down passage 18 (one of a pair) to the annular chamber 19 and thence forwardly through baffle ports 84, then through openings 20 in the flange 21 of the fluid tip 22 to reach the annular discharge opening defined between the end of the tip 22 and the port 23 in the air cap 24.

The other portion of the air passes into nipple 25, under adjustable control of the valve 26, to annular chamber 27 and forwardly therefrom through ports 28 to the annular space 29 and the horn discharge passages 30.

With further retraction of the trigger 3 the extension 31 of the air valve strikes the flanged end 32 of the thimble 33 fixed to the material needle valve 34 and moves the needle valve from its seat in the fluid tip 22 permitting the discharge of coating material therefrom. This material is atomized in the regular manner by the air issuing around the tip through the air cap port 23 and the spray discharge is flattened into the utilitarian fan form by the air from horn ports 30. This described operation of the material and air discharge follows convention of long standing.

Almost simultaneously with but preferably slightly subsequent to the opening of the air valve 10 and the initiation of the flow of air, the trigger 3 meets and moves rearwardly the stem 35 of the additive agent valve 36 and opens this valve against spring 37. Accordingly the additive agent under the required pressure flows from bore 7 past the valve 36 into the tube 13 and thence through the metering orifice 38 into the line of air flow. The additive agent in the quantity predetermined by the selected size of the metering orifice 38 and by the relative pressures under which the air and the additive agent are delivered joins the air and travels with it to the air cap 24. Carried by the air into mixing relation with the discharged spray material the additive agent is distributed throughout the spray material in a manner to properly fulfill its function of curing or otherwise reacting with the applied coating of material.

The modification illustrated in Figure 2 utilizes a design of spray gun similar to that shown in Figure 1 except for a different form of additive agent valve and a rearrangement of the path for the additive agent from its valve into confluence with the air. The valve 39 seats upon a composition washer 40 and when moved therefrom by the action of the trigger 3 the additive agent flows into a gradually deeper metering groove 41 in the valve stem 42. As the valve is further opened a deeper section of the groove is within the washer 40 and defines with the inner wall of the washer a larger metering port. The opening movement of the additive agent valve 39 is synchronized with the opening movement of the material needle valve 34 whereby with a greater discharge of spray material a greater quantity of additive agent is injected into the air stream.

From the groove 41 the additive agent travels upwardly through ported bushing 43 and passage 63 into the space 64 around valve casing 12 where it joins the air reaching outlet ports 15 from air valve 10. The modification of Figure 2 is superior to that of Figure 1 in respect to the variable metering passage and also in that the additive agent does not have to pass through the air valve. It is best to minimize the travel of the additive agent with the air in order to lessen the points where some accumulation of the agent may temporarily occur to subsequently cause a sudden surging discharge when the accumulation is dislodged. Also, some of the additive agents are corrosive and parts of the spray gun with which such additive agents come in contact must be made of resistant materials. There may accordingly be a saving in making special expensive parts if the path for the additive agents through the spray gun is as short as possible.

The spray gun of Figure 3 instead of having a tubular air valve coaxial with the spray material needle valve places the air valve below the needle valve. This is a more common arrangement.

In this embodiment the additive agent valve 44 is in a casing 45 attached to the lower end of the handle 2. The casing 45 and a portion of the handle are shown in section in Figure 4. The additive agent supply hose is connected to inlet nipple 46 through which the agent reaches valve 44.

When the trigger 3 is retracted manually (or mechanically in an automatic installation) the air in bore 5 passes past air valve 47 and not only progresses through the spray gun in its normal route but also partially descends through peripheral notches 48 in the agent nozzle 49 down bore 7 on the outside of tube 50.

This air continues down through bore 51 in the casing 45 and through passage 52 to the outer end of the cylinder 53. Here the air acts upon the piston 54 and therethrough moves the valve 44 from its seat, the valve being directly coupled to the piston by the valve stem and piston rod 55. The right end of the cylinder as viewed in Figure 4 has the atmospheric vent 56.

A piston tail rod 57 extends exteriorly of the casing and is threaded to receive the adjustable stop member 58. This member receives the thrust of the spring 59 by which the valve 44 is held to its seat when the air pressure on the piston 54 is relieved through closing of the air valve 47. Air beyond this valve then escapes through the spray gun passages to the air cap.

On opening of the additive agent valve 44, the agent flows past the valve and is metered by the positioning of the slanting groove 60 in the annuar restricting shoulder 61 as predetermined by the setting of the stop member 58. The agent travels upwardly through tube 50 and out nozzle 49 into confluence with the air flowing through ports 62 from air valve 47. The additive agent then travels with the air to the air cap 24 and is exteriorly intermixed with the spray material.

A more specialized embodiment of the invention is presented in Figures 5, 6, 7 and 8. In this design the gun body 65 has an inlet 66 for the additive agent at its forward end alongside the inlet 67 for the coating material. It has the regular air connection 4 on the handle 2 with the air valve in the upper end of the handle as in the spray gun of Figure 3. The coating material needle valve is also the same design as that of the embodiment of Figure 3.

The air reaching horizontal bore 17 in the top of the spray gun is divided as described in reference to the spray gun of Figure 1. As may be seen in Figure 7 the air from bore 17 in part passes down diagonal passages 68 (comparable to passage 18 of Figure 1) to reach annular chamber 19 which communicates with the center port 23 of air cap 24. The other portion of the air passes by adjustable valve 26 into nipple 25 and thence from annular groove 27 forwardly to the horn ports 30. As illustrated in Figure 7 passages 68 have a restricted entering section beyond which they are enlarged. Both passages 68 have the same dimensions so the air flow and velocity as well as the entering and discharge pressures are the same in each.

The additive agent flows upwardly from its inlet 66 through passage 69 which is angled slightly outwardly and rearwardly. Passage 69 communicates with bore 70 sealed on its rearward side by the bushing 71 which is axially ported for the reciprocation therethrough of the stem 72 of additive agent valve 73. The latter seats in the restricted opening 74 in the flanged end of the bushing 71. An annular groove 75 and radial drillings 76 provide communication between the end of passage 69 and the valve controlled opening 74.

When valve 73 is drawn from its seat by the trigger action the additive agent flows through opening 74 to the extent permitted by the amount of retraction of the valve 73.

The additive agent then reaches an extension 77 of reduced diameter of bore 70. In the upper side of this extension is an exit orifice 85 formed by the interception of a lateral drilling 78. The drilling 78 is closed by a plug 79 which has an inward tubular end 80 holding orifice disc 81 in place against a ring gasket 82. The tubular end 80 has side ports providing a path for the additive agent to the orifice disc 81. From the disc the agent flows through horizontal passage 83 which meets diagonal passage 68 at a point adjacent the termination of the restricted entering section whereby a partial venturi action assists the entry of the additive agent into the passage 68.

From passage 68 the mixture of air and additive agent enters annular chamber 19 and proceeds forwardly through baffle ports 84 and openings 20 in the fluid tip flange 21 to the central discharge port 23 of the air cap 24. The air travelling down the opposite passage 68 joins the mixture of additive agent and air in the annular chamber 19 and the additive agent is distributed throughout all of the air projected from the central discharge port 23. This body of air is the main atomizing medium for the coating material issuing from the fluid tip 22 and therefore the additive agent is uniformly mixed with the coating material as the latter is atomized. The air from horn discharge passages 30 in this embodiment does not carry any additive agent. While such air improves atomization, its main function is to flatten the spray discharge into a desirable fan pattern. The air from the horn discharge passages 30 does not penetrate the coating material discharge to any considerable degree and therefore when it does carry an additive agent much of the latter does not combine with the coating material but is borne away with the expended air stream. This embodiment of the invention is accordingly more conserving of the additive agent than the previously described designs.

The retraction of the valve 73 controlling the flow of additive agent is secured through action of the trigger 86. Welded to the side of the trigger is a bracket 87 with a lateral arm 88 having a threaded opening 89. A bushing 90 freely encircling the valve stem 72 is threaded through the opening 89 and held in selected position by a lock nut 91.

The rear end of the stem 72 extends into a spring housing 92 which is threaded into a projection 93 on the side of the gun body above the handle. The spring 94 thrusts against a ring 95 fixed on the stem 72 to hold the valve 73 in closed position. Ahead of the ring 95 loosely riding on the stem 72 is a stiff spring 96 within a tubular casing 97. At the forward end of the casing the spring 96 bears against the inserted flange end of a spool 98 also slidably mounted on the valve stem 72.

When the trigger is pivoted rearwardly, just after the air valve is opened, the end of bushing 90 meets the forward end of the spool 98 and moves it and the tubular casing 97 rearwardly. Due to the tenseness of the spring 96 the spool and casing are temporarily held in relatively extended position. The end of the casing 97 abuts ring 95 and therethrough drives the valve stem 72 against the spring 94 until the end of the stem is stopped by the housing 92. Spring 96 is sufficiently stronger than spring 94 to remain elongated while spring 94 is being compressed.

With further retraction of the trigger following the halting of movement of stem 72 at a point predetermined by the positioning of the housing 92, spring 96 is collapsed by the continued rearward movement of the spool 98 as the latter telescopes into the now stationary casing 97. This further pivoting of the trigger opens the coating material valve to the extent desired.

Should the discharge of the catalyst or additive agent be interrupted or decreased below the desired proportion, the coating material deposited may never cure or harden properly and is then likely to fail in protecting the surface to which it is applied.

In order to avoid difficulty from this source, the spraying should always be discontinued whenever any decrease in catalyst discharge occurs. However, because of the small quantity of catalyst or additive agent and its usual colorless nature, failure in its discharge rate is not perceptible to the eye of the spray gun operator.

This invention provides means for handling this serious problem by immediately warning the operator, and by automatically stopping the spraying action whenever the normal flow of the additive agent is disturbed.

Such means are illustrated in Figure 9 and include a flow meter 101 of conventional design in the supply line 102 which delivers the additive agent to the spray gun. Depending from the float 103 of flow meter 101 is a rod 104 reaching into a well in an attached casing 105. On the lower end of the rod is a secondary float and armature 106. At a selected position adjacent the vertical path of the secondary float and armature 106 is fixed a coil 107 carrying a low electronic current. With normal flow of the additive agent the secondary float is held above the coil 107 and does not affect it. However, with a dangerous drop in the flow rate the secondary float 106 is lowered to reactive association with the coil and as an armature brings about a change in the current through the coil. This fluctuation is registered and amplified by an electronic system within the box 108 and through relays turns on the warning light 109 and actuates the solenoid 110 to close valve 111. This valve is in the supply line 112 delivering coating material to the spray gun and is normally held open by the spring 113.

On notice from the warning light, the spray gun operator may immediately shut off his spray gun if it is not done automatically with a valve such as valve 111. The operator is then free to locate and correct the cause of the decrease in the flow of the additive agent, which might arise from a clogging in a passage of the spray gun, the exhausting of the source of supply, or from other factors. With a re-establishment of the proper flow the secondary float 106 rises away from the coil 107 and the electronic system responds by dimming the warning light 109 and, when utilized, releasing the solenoid 110 to permit valve 111 to open under the thrust of spring 113.

This invention is essentially concerned with additive substances which are consumed in very small quantities, the volume of which in relation to the mass of air passing through a spray gun is so slight that the injection of the substance into the air does not detract from the atomizing capability of the air in its customary action upon the main coating material to any serious degree even though nozzles of standard design for the application of a coating material alone are utilized. Such additive agents in present or proposed used are substantially non-drying, of moderate viscosity, and unpigmented so may be directed through restricted metering ports and passages without undue difficulty. They are therefore adaptable to the exact flow control usually necessary for successful results and which is provided by the spray gun of this invention.

It is, of course, not the intention to restrict this invention to the use of additive agents having ideal characteristics and utilized in an optimum volume, as satisfactory results may also be obtained with the invention in feeding additive agents which are quite viscous, pigmented or of other troublesome nature, or when required in an amount appreciably detrimental to the atomizing power of the air.

While preferred embodiments of the invention have been disclosed, various amplifications and modifications may be made in details and also in major features without departing from the spirit of the invention. Illustrative of such variations would be a positionable nut threaded upon additive agent valve 72 in Figure 7 in place of the adjustable bushing 90 on the trigger, the position of both being selectable for timing the opening of the valve by the trigger in relation to the openings by the trigger of the air and coating material valves. With such a substitution the trigger would have a positive non-yielding contact through the positionable nut with the valve 72, in place of the lost motion arrangement provided by the telescoping of spool 98 and housing 97.

Another alternate considered obvious would be an air cap having auxiliary air outlet ports around center port 23 and also receiving air from channels 18 or 68. Such supplemental ports are very conventional in high production air caps. The air discharged from these auxiliary ports improves the atomization but also has some effect upon the shaping of the discharged coating material. Where reference is made in the description and claims to the center port of the air cap this term should be interpreted as including adjacent auxiliary ports cooperating with the center port and receiving air from the same divisional source as distinguished from ports in the horns receiving air from the branch passage controlled by valve 26.

The particular design of flow meter and control devices associated with the flow meter to give a warning signal and close a supply valve are not a direct part of this invention and other designs may be as adaptable for the purpose. For instance, instead of the armature and coil, a light shielding element carried by the float could be utilized to intercept a light ray aimed at a photoelectric cell to therethrough actuate the warning signal and supply valve. While a drop in the flow rate of the additive agent is discussed and is the specific failure to which the embodied equipment responds, an excess flow of additive agent is also objectionable although considered far less likely. It is apparent that the flow meter arrangement as shown and described could easily have additional elements, including a second coil above the one shown, responsive to an unusual rise of the float caused by excessive flow to give warning of this less probable occurrence. Similarly, a second photo-electric cell could be so placed that a certain rise in the float would actuate the cell and give a signal.

In most situations it is considered desirable to have the valve actuated by the flow meter in the supply line of the coating material. With an installation in which automatic spray guns are employed, air is frequently the motivating agent for such guns, opening and closing the gun valves through the action of an air driven piston. For such an installation the valve closed by the flow meter control could be in the supply line for the motivating air. Even in the use of hand spray guns there may be situations where shut-off of the atomizing air line may be preferred to closing a material valve. This may be more practical when the nature of the coating material has an abrasive or other adverse effect upon a repeatedly operated valve.

While compressed air is the most common atomizing medium in use, steam, preferably superheated, has certain advantages in special situations. Where the heat of such steam assists the function of the additive agent, there would be this added benefit in employing it as the atomizing medium. The term "air" as used herein should be interpreted broadly to include steam and other gases shown in the prior art to be satisfactory for the same purpose.

Having thus described the invention, what is claimed as new is:

1. In a spray gun for the application of a coating material and a considerably lesser quantity of an additive agent in intermixed and air atomized form, a nozzle having an outlet for the discharge of coating material directly to the atmosphere and a separate outlet for the discharge of atomizing air directly to the atmosphere, an inlet connection receiving coating material from a supply source, means providing a passage from said inlet connection to the outlet for the coating material, an air entering connection, means providing a passage from the air entering connection to the outlet for atomizing air, an additive agent supply connection, and means providing a passage from the additive agent supply connection leading to an intermediate point in the passage from the air entering connection to the outlet for atomizing air whereby the additive agent is introduced and mixed with the air within the spray gun before the air is discharged into atomizing relation with the discharged coating material.

2. A spray gun according to claim 1 in which there are means metering the flow of additive agent into the air passage.

3. A spray gun according to claim 1 in which there is a valve in the air passage controlling the flow of air therethrough and the intermediate point in the air passage to which the additive agent passage leads is between the location of the valve and the outlet for the air.

4. A spray gun according to claim 1 in which a handle depends from the rearward portion of the spray gun and the air entering connection and the additive agent supply connection are on the lower end of the handle.

5. A spray gun according to claim 1 in which there is a valve controlling the flow of additive agent, a valve controlling the flow of air, and common means for opening said valves.

6. A spray gun according to claim 1 in which there is a valve controlling the flow of air, a valve controlling the flow of additive agent, means opening the air valve and means responsive to the flow of air beyond the air valve opening the additive agent valve.

7. A spray gun according to claim 1 in which there is a valve controlling the flow of air, a valve controlling the flow of additive agent, means for openings said valve, and means associated with the additive agent valve adjustably metering the flow of additive agent.

8. A spray gun according to claim 1, means establishing a definite rate of flow of additive agent through said spray gun when the spray gun is operated, a flow meter registering the definite rate, a supply line to the spray gun, a normally open valve in the line, and means associated with the flow meter closing the valve when the flow of additive agent as registered by the flow meter drops below the definite rate.

9. A spray gun according to claim 1 in which the passage from the air entering connection is divided into two branches, there is a separate air outlet in the nozzle to which each branch communicates and the passage from the additive agent supply connection leads to one only of the branches.

10. A spray gun according to claim 9 in which the outlet of the air branch to which the passage for additive agent leads is in the center of the nozzle and discharges the main body of air atomizing the coating material.

11. In a spray gun for the application of a coating material and an additive agent in intermixed and air atomized form a fluid tip for the discharge of the coating material, an air cap mounted over the fluid tip with port means for discharging air in atomizing relation with the discharge of coating material, an air passage leading to the air cap, means delivering air to said passage, an entering connection for coating material near the forward end of the spray gun in communication with the fluid tip, a supply connection for the additive agent adjacent the entering connection for coating material, a delivery passage from the supply connection to the air passage, a coating material control valve seating in the fluid tip, an additive agent control valve seating in a portion of the delivery passage, and means for opening said valves.

12. A spray gun according to claim 11, an adjustable stop means for the additive agent control valve, and means permitting the additive agent control valve to be stopped at any selected point of opening independently of the opening of the coating material control valve.

13. In combination, a spray gun for the application of a coating material and a considerably lesser quantity of an additive agent in intermixed and air atomized form, means delivering coating material to the spray gun and discharging it in unatomized form to the atmosphere therefrom, separate means delivering additive agent to the spray gun, means supplying a stream of atomizing air to the spray gun, means dispersing the additive material in the stream of air within the spray gun and discharging the air to the atmosphere into atomizing relation with the discharged coating material, means establishing a definite rate of flow of additive agent when the spray gun is operating, a meter registering the rate of flow, a movable element associated with the meter and self-positioning in response to the rate of flow registered, means reactive to the element when the latter is in a position reflecting a variation from the definite rate of flow, and a signaling device actuated by the reactive means when the latter reacts from a variation from the definite rate of flow.

14. A combination according to claim 13 in which the signaling device is a shut-off valve in the means delivering coating material to the spray gun.

15. In a spray gun for the application of a coating material and an additive agent in intermixed and air atomized form, a main body member, a discharge nozzle at the forward end of the body member, an air passage in the body member for conveying atomizing air to the discharge nozzle, a handle depending from the rearward end of the body member, a coating material inlet and an additive agent inlet near the forward end, a coating material discharge valve seating in the nozzle and extending lengthwise, substantially axially of the body member, a pivoted trigger having engaging relation with the coating material discharge valve, an additive agent discharge valve, a forwardly located offset portion of the body member in which the additive agent valve seats, a passage for the additive agent, controlled by the additive agent valve, said passage extending from the offset portion of the body member and communicating with the atomizing air passage in the body member, whereby the additive agent is introduced and mixed with the atomizing air before the atomizing air reaches the discharge nozzle, a rearward extension of the additive agent valve laterally spaced from the longitudinal axis of the body member, and a lateral arm from the trigger having opening engagement with the rearward extension of the additive agent valve.

16. A spray gun according to claim 15 in which there is a rearwardly located lateral projection on the main body member in line with the forwardly located offset portion and a spring supported by the projection and bearing upon the additive agent valve to incline it to its closed position.

17. In a spray gun for the application of a coating material and an additive agent in intermixed and air atomized form, a nozzle having an outlet for the discharge of coating material and an outlet for the discharge of atomizing air, an inlet connection receiving coating material from a supply source, means providing a passage from said inlet connection to the outlet for the coating material, an air entering connection, means providing an air passage from the air entering connection to the outlet for atomizing air, a venturi restriction in the air passage, an additive agent supply connection, and means providing an additive agent delivery passage from the additive agent supply connection to the air passage adjacent the venturi restriction whereby the action of the air flowing through the venturi restriction lowers the pressure opposing the introduction and mixing of the additive agent with the air within the spray gun prior to the discharge of air with the intermixed additive agent into atomizing relation with the discharged coating material.

18. In a spray gun for the application of a coating material and an additive agent in intermixed and air atomized form, a nozzle of conventional design for the atomization of a coating material alone, said nozzle having a center outlet for the discharge of coating material and an annular outlet for the discharge of atomizing air encircling the material outlet, an inlet connection receiving coating material from a supply source, means providing a passage from said inlet connection to the outlet for the coating material, an air entering connection, means providing an air passage from the air entering connection to the outlet for the atomizing air, an air flow controlling valve in the air passage, an additive agent supply connection, and means providing a passage from the additive agent supply connection to the air passage, whereby the additive agent is introduced and mixed with the air within the spray gun before the air is discharged into atomizing relation with the discharged coating material.

19. In a spray gun for the application of a coating material and a considerably lesser quantity of additive agent in intermixed and air atomized form, a nozzle having an outlet for the separate discharge of coating material and an outlet for the discharge of atomizing air, an inlet connection receiving coating material under pressure from a supply source, means providing a passage from said inlet connection for delivery of coating material in substantial quantity to the nozzle, an air entering connection, means providing a passage from said entering connection for delivery of atomizing air to the nozzle in sufficient quantity to atomize the coating material, an additive agent supply connection, and means providing a passage from said supply connection for introducing into the atomizing air passage the additive agent in considerably lesser quantity than that of the coating material and not in sufficient quantity to seriously affect the capacity of the air to atomize the coating material, whereby the additive agent is mixed with the air within the spray gun before the air is discharged into atomizing relation with the discharged coating material.

References Cited in the file of this patent

UNITED STATES PATENTS

| | | |
|---|---|---|
| 1,546,357 | Allen | July 21, 1925 |
| 1,729,634 | Thompson | Oct. 1, 1929 |
| 1,731,953 | Thomson | Oct. 15, 1929 |
| 2,310,633 | Heimburger | Feb. 9, 1943 |
| 2,335,116 | Hansen | Nov. 23, 1943 |
| 2,450,503 | Drummond | Oct. 5, 1948 |
| 2,495,540 | Nichols et al. | Jan. 24, 1950 |
| 2,511,626 | Einbecker | June 13, 1950 |
| 2,551,585 | Curran | May 8, 1951 |
| 2,628,297 | Grauer | Feb. 10, 1953 |
| 2,631,138 | Dannenberg | Mar. 10, 1953 |
| 2,643,243 | Dannenberg | June 23, 1953 |
| 2,687,739 | Shelburne | Aug. 31, 1954 |
| 2,739,843 | Baur | Mar. 27, 1956 |